United States Patent
Yan et al.

(10) Patent No.: US 10,056,638 B2
(45) Date of Patent: Aug. 21, 2018

(54) PHOSPHONIUM CATIONS AND POLYMERS INCORPORATING THEM

(71) Applicants: Yushan Yan, Hockessin, DE (US); Bingzi Zhang, Beijing (CN); Shuang Gu, Newark, DE (US)

(72) Inventors: Yushan Yan, Hockessin, DE (US); Bingzi Zhang, Beijing (CN); Shuang Gu, Newark, DE (US)

(73) Assignee: UNIVERSITY OF DELAWARE, Newark, DE (US)

( * ) Notice: Subject to any disclaimer, the term of this patent is extended or adjusted under 35 U.S.C. 154(b) by 74 days.

(21) Appl. No.: 15/327,061

(22) PCT Filed: Jul. 21, 2015

(86) PCT No.: PCT/US2015/041321
§ 371 (c)(1),
(2) Date: Jan. 18, 2017

(87) PCT Pub. No.: WO2016/014524
PCT Pub. Date: Jan. 28, 2016

(65) Prior Publication Data
US 2017/0149080 A1    May 25, 2017

Related U.S. Application Data

(60) Provisional application No. 62/026,755, filed on Jul. 21, 2014.

(51) Int. Cl.
*H01M 8/1034* (2016.01)
*B01D 61/42* (2006.01)
(Continued)

(52) U.S. Cl.
CPC ........ *H01M 8/1034* (2013.01); *B01D 61/422* (2013.01); *B01D 71/06* (2013.01);
(Continued)

(58) Field of Classification Search
CPC .............................. H01M 8/1034; C08G 5/485
(Continued)

(56) References Cited

U.S. PATENT DOCUMENTS

| | | |
|---|---|---|
| 2009/0259013 A1 | 10/2009 | Litt |
| 2011/0207028 A1 | 8/2011 | Fukuta |
| 2011/0237690 A1 | 9/2011 | Yan |
| 2012/0119410 A1 | 5/2012 | Yan |

FOREIGN PATENT DOCUMENTS

WO    2013103420    7/2013

OTHER PUBLICATIONS

Tonozuka et al. Considerations of polymerization method . . . Polymer, vol. 52, 2011, pp. 6020-6028 [online]. [retrieved on May 28, 2018] Retrieved from the internet <URL: https://www.sciencedirect.com/science/article/pii/S0032386111009074> (Year: 2011).*

(Continued)

*Primary Examiner* — Basia A Ridley
*Assistant Examiner* — James M Erwin
(74) *Attorney, Agent, or Firm* — Ratnerprestia

(57) ABSTRACT

A compound including a cation of the following structure is provided (1), wherein Q is selected from the group consisting of polymer residues and substituted or unsubstituted alkyl groups, and R is H or a polymer residue. A membrane including the above cation, and electrochemical devices employing this membrane, are also provided.

(Continued)

Fuel Cell

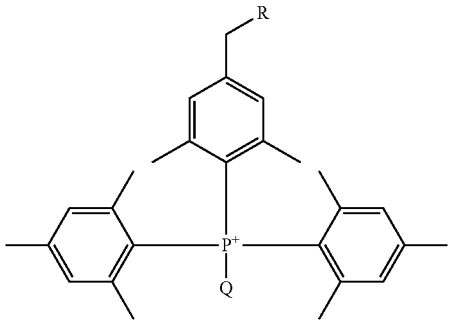

24 Claims, 6 Drawing Sheets

(51) Int. Cl.
```
C25B 13/08      (2006.01)
C02F 1/46       (2006.01)
B01D 71/06      (2006.01)
B01J 41/13      (2017.01)
C08G 75/20      (2016.01)
C08G 65/48      (2006.01)
H01M 8/1018     (2016.01)
C02F 103/08     (2006.01)
```
(52) U.S. Cl.
CPC .............. *B01J 41/13* (2017.01); *C02F 1/4604* (2013.01); *C08G 65/485* (2013.01); *C08G 75/20* (2013.01); *C25B 13/08* (2013.01); *B01D 2325/42* (2013.01); *C02F 2103/08* (2013.01); *C02F 2201/46115* (2013.01); *H01M 2008/1095* (2013.01); *H01M 2300/0082* (2013.01)

(58) Field of Classification Search
USPC ........................................................ 429/492
See application file for complete search history.

(56) References Cited

OTHER PUBLICATIONS

International Search Report and Written Opinion for International Application No. PCT/US2015/41321, dated Oct. 23, 2015, 8 pages.
Gu et al., Permethylcobaltocenium Based Hydroxide Exchange Membranes with High Stability, 224th ECS Meeting, The Electrochemical Society, 2013, Abstract, 1 page.
Agel et al., "Characterization and use of anionic membranes for alkaline fuel cells", Journal of Power Sources, 2001, vol. 101, pp. 267-274.
Danks et al., "Comparison of PVDF- and FEP-based radiation-gradted alkaline anion-exchange membranes for use in low t4emperature portable DMFCs", Journal of Materials Chemistry, 2002, vol. 12, pp. 3371-3373.
Guo et al., "Synthesis and characterization of novel anion exchane membranes based on imidazolium-type ionic liquid for alkaline fuel cells", Journal of Membrane Science, 2010, vol. 362, pp. 97-104.
Thomas et al., "A Stable Hydroxide-Conducting Polymer", Journal of the American Chemical Society, 2012, vol. 134, pp. 10753-10756.
Arges et al., "Assessing the influence of different cation chemistries on ionic conductivity and alkaline stability of anion exchange membranes", Journal of Materials Chemistry, 2012, vol. 22, pp. 3733-3744.
Li et al., "Comb-shaped polymers to enhance hydroxide transport in anion exchange", Energy & Environmental Science, 2012, vol. 5, pp. 7888-7892.
Huang et al., "Synthesis and Characterization of Quaternized Poly(4-vinylpyridine-co-styrene) Membranes", Journal of Applied Polymer Science, 2005, vol. 96, pp. 2146-2153.
Gu et al., "A Soluble and Highly Conductive Ionomer for High-Performance Hydroxide Exchange Membrane Fuel Cells", Angew. Chem. Int. Ed., 2009, vol. 48, pp. 6499-6502.
Noonan et al., "Phosphonium-Functionalized Polyethylene: A New Class of Base-Stable Alkaline AnionExchange Membranes", Journal of the American Chemical Society, 2012, vol. 134, pp. 18161-18164.
Zhang et al., "Tertiary sulfonium as a cationic functional grouop for hydroxide exchange membranes", RSC Advances, 2012, vol. 2, pp. 12683-12685.
Zha et al., "Metal-Cation-Based Anion Exchange Membranes", Journal of the American Chemical Society, 2012, vol. 134, pp. 4493-4496.
Gu et al., "Engineering the van der Vaals Interaction in Cross-Linking-Free Hydroxide Exchange Membranes for Low Swelling and High Conductivity", ChemSusChem, 2012, vol. 5, pp. 843-848.
Gu et al., "Self-crosslinking for dimensionally stable and solvent-resistant quaternary phosphonium based hydroxide exchange membranes", Chem. Comun., 2011, vol. 47, pp. 2856-2858.
Gu et al., "Quaternary Phosphonium-Based Polymers as Hydroxide Exchange Membranes", ChemSusChem, 2010, vol. 3, pp. 555-558.
International Preliminary Report on Patentability for International Application No. PCT/US2015/041321, dated Jan. 24, 2017, 6 pages.

\* cited by examiner

PHOSPHONIUM CATIONS AND POLYMERS INCORPORATING THEM

CROSS REFERENCE TO RELATED APPLICATIONS

This application is a U.S. National Phase filing of International Application PCT/US2015/041321, filed on 21 Jul. 2015, and claims priority benefit of U.S. Provisional patent application No. 62/026,755, filed on 21 Jul. 2014, the entirety of which applications are incorporated herein by reference for all purposes.

STATEMENT REGARDING FEDERALLY SPONSORED RESEARCH

This invention may have been made with support under Contract No. W911NF-10-1-0520. The government may have rights in this invention.

BACKGROUND OF THE INVENTION

Ammonium cations, exemplified by benzyl trimethyl ammonium (BTMA), have long been used for hydroxide exchange membranes (HEMs), establishing the cation standard for HEMs. Recently, the quaternary phosphonium cation benzyl tris(2,4,6-trimethoxyphenyl) phosphonium (TPQP$_{Bn}$) was attached to a polymer backbone to effectively improve the alkaline stability, hydroxide conductivity and solubility of HEMs. TPQP$_{Bn}$ based HEMs showed better alkaline stability than those based on BTMA analogs. However, still further improvements would be beneficial.

SUMMARY OF THE INVENTION

In some embodiments, the invention provides a compound including a cation of the following structure

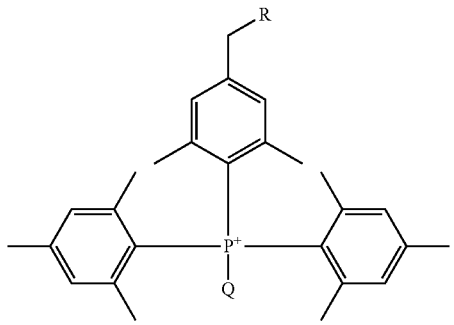

wherein Q is selected from the group consisting of polymer residues and substituted or unsubstituted alkyl groups, and R is H or a polymer residue. In some embodiments, the invention provides a membrane including the above cation. In some embodiments, the invention provides an electrochemical device employing this membrane.

DETAILED DESCRIPTION OF THE INVENTION

The invention was arrived at in light of mechanistic investigations designed to elucidate the reasons for the superior stability of TPQP$_{Bn}$ cations for use in HEMs, as well as the mechanism by which these cations decompose over time. The inventors studied the alkaline stability of a series of phosphonium cations, and as a result have now proposed a multi-step degradation mechanism for the TPQP$_{Bn}$ cation. Based on this new insight, the inventors have developed a superior phosphonium-based cation, quaternary tris(2,4,6-trimethylphenyl) phosphonium (9MeTPP$_Q$), having excellent alkaline stability. Details of this work are presented below, followed by a description of embodiments of the invention resulting from it.

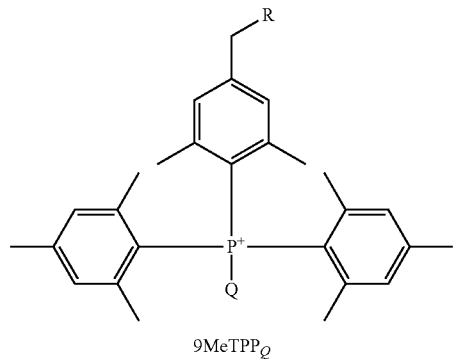

9MeTPP$_Q$

Mechanistic Studies

The small-molecule model compound TPQP$_{Bn}$Cl was synthesized by reacting tris(2,4,6-trimethoxyphenyl) phosphine with benzyl chloride in THF at 40° C. Although TPQP$_{Bn}$Cl was prepared in the chloride form, subsequent degradation testing rapidly and irreversibly converted it to the hydroxide form (TPQP$_{Bn}$OH) with no need for a separate ion exchange step.

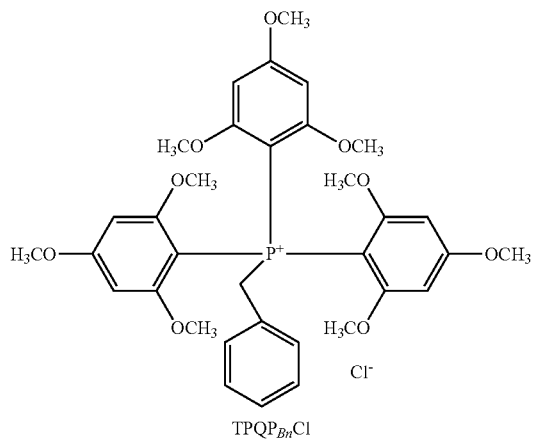

TPQP$_{Bn}$Cl

BTMABr was synthesized by reaction of trimethyl amine with benzyl bromide. As with the TPQP$_{Bn}$Cl, BTMABr converts trivially to BTMAOH during alkaline degradation testing. The chemical structures of TPQP$_{Bn}$Cl and BTMABr were confirmed by $^1$H NMR, with clear assignments for all peaks.

Figure 1:
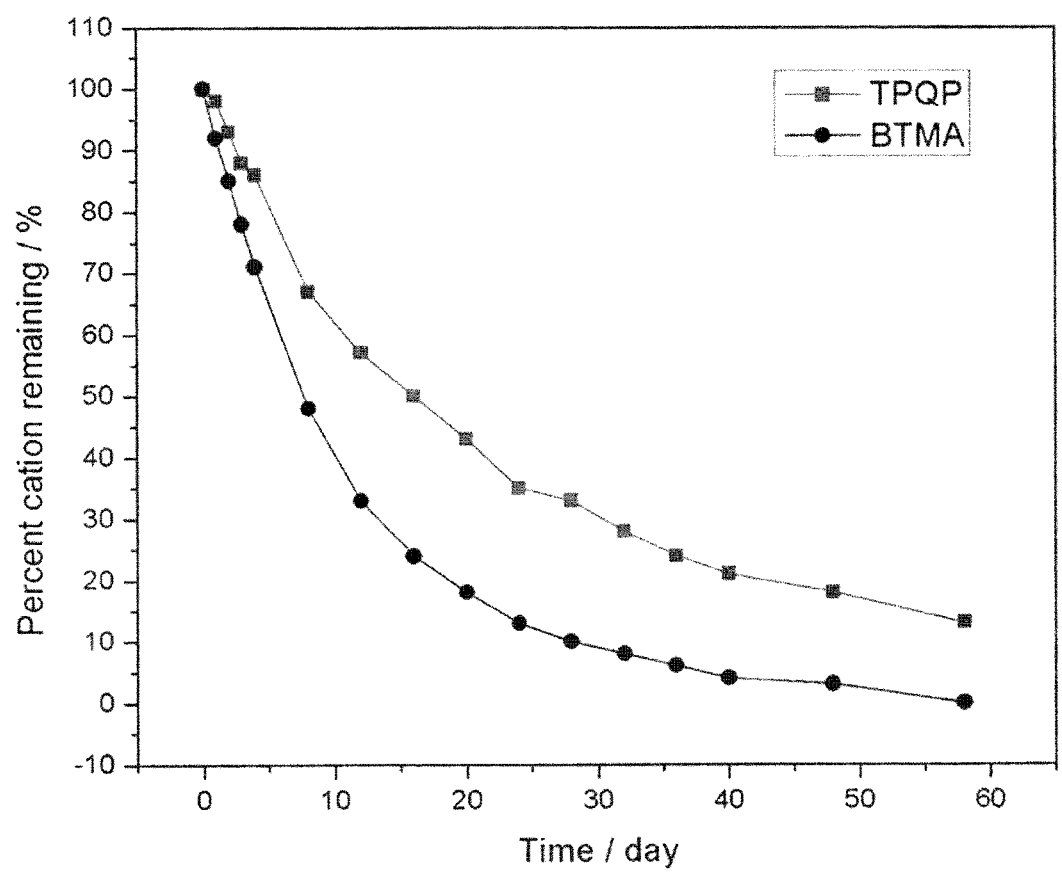
FIG. 1 shows alkaline degradation rates of two prior art compounds: BTMABr and TPQP$_{Bn}$Cl.

Both BTMABr and TPQP$_{Bn}$Cl degraded substantially during long term alkaline stability testing, as seen in FIG. 1. TPQP$_{Bn}$Cl degraded less than BTMABr (59% loss vs. 82% after 20 days) judging by the gradual decrease in area of the largest peak as compared to the constant area of the largest internal standard peak. The degradation rate of BTMABr was judged by the gradual decreases in area of the aromatic peak relative to the constant area of the largest internal standard peak.

To study the reasons for degradation of the TPQP$_{Bn}$ cation, three TPQP$_{Bn}$ analogs were synthesized by the same general method. They were chosen for their simplicity and similarity to TPQP$_{Bn}$ in terms of steric hindrance, with ring substituents of varying degrees of electron donating capability. The analogs were TPPCl (a), 3MeTPPCl (b), and 3MeOTPPCl (c), shown below.

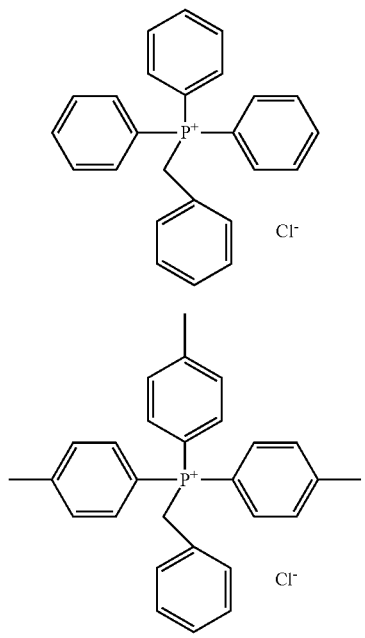

(a)

(b)

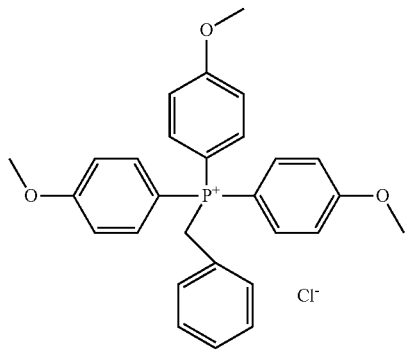

(c)

-continued

Figure 2:
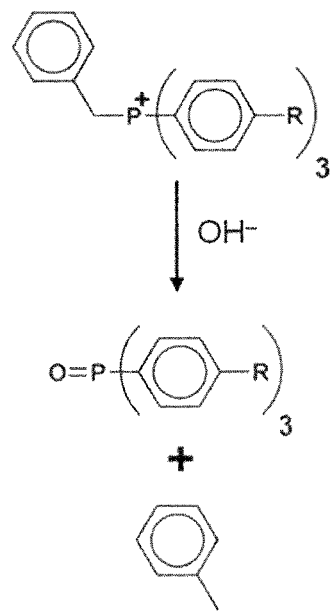
FIG. 2 shows alkaline degradation rates of three TPQP$_{Bn}$Cl analogs.
Figure 2:
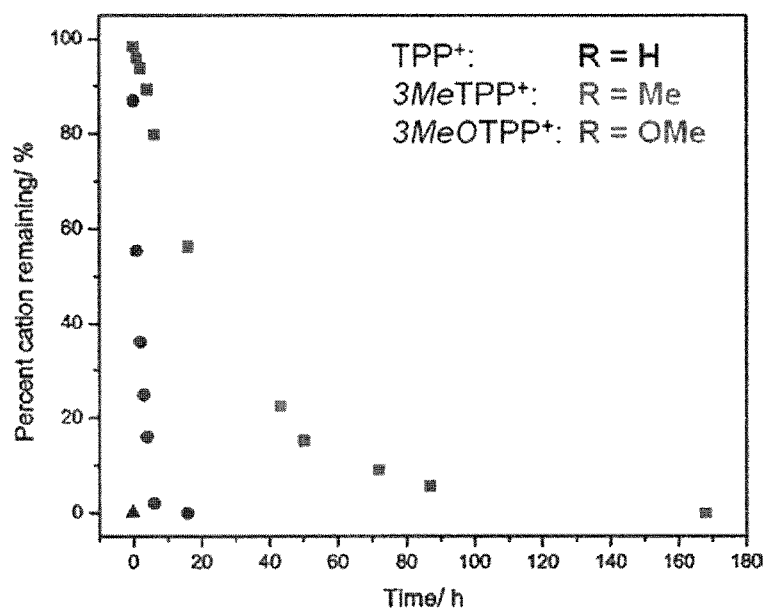

In alkaline durability testing, the three analogs degraded into the corresponding phosphine oxide and toluene (FIG. 2). Degradation of 0.033 M phosphonium salt in 1 M KOD (solvent: 5 CD$_3$OD:1 D$_2$O) at 20° C. was calculated from the change in area of $^1$H NMR peaks.

Figure 3:
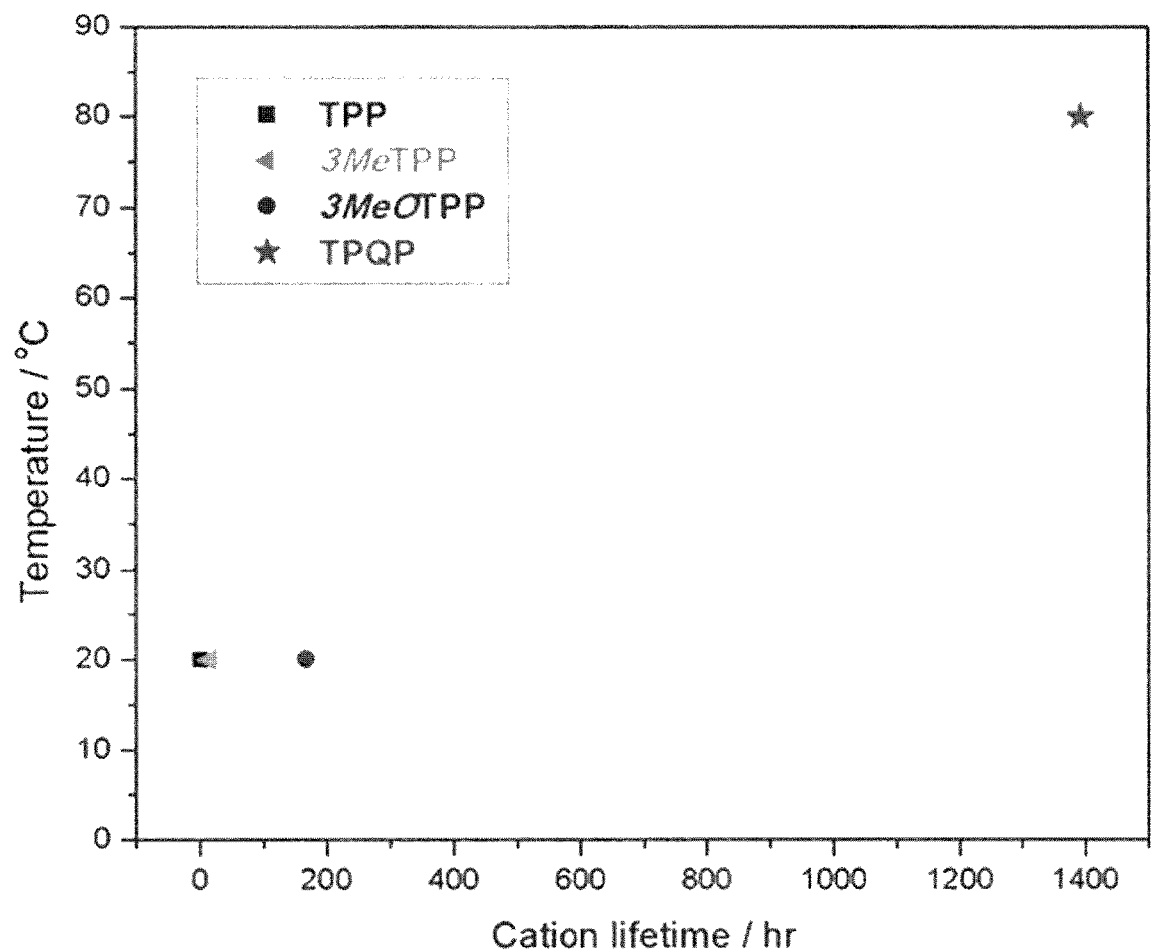
FIG. 3 shows cation lifetimes during alkaline degradation of TPQP$_{Bn}$Cl and the three analogs evaluated in FIG. 2.

Changing the ring substituent from —H (weakly electron donating) to -Me to —OMe (strongly electron donating) increased the alkaline stability, but all three analogs still completely degraded unacceptably quickly (within a week) even at room temperature. Cation lifetimes are plotted in FIG. 3, which shows that TPQP$_{Bn}$ was much more stable than any of its three analogs. TPQP$_{Bn}$Cl was subjected to the same durability test as its analogs, but at elevated temperature (80° C. vs 20° C.) due to its superior stability. After 58 days, it still had not degraded completely (FIG. 1).

Despite the similarity of TPQP$_{Bn}$Cl to its analogs, neither phosphine oxide nor toluene was produced by its degradation. To account for this unexpected behavior, and without wishing to be bound by this possible explanation, the inventors propose a novel multi-step mechanism (Scheme 1) that includes ether hydrolysis, inner salt formation, ketone rearrangement and further hydrolysis.

Scheme 1

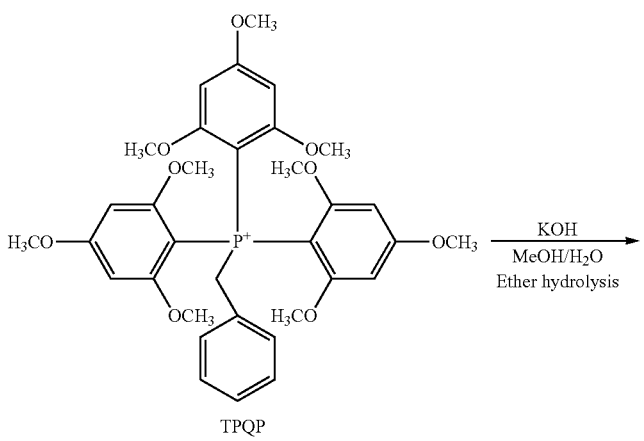

TPQP

-continued

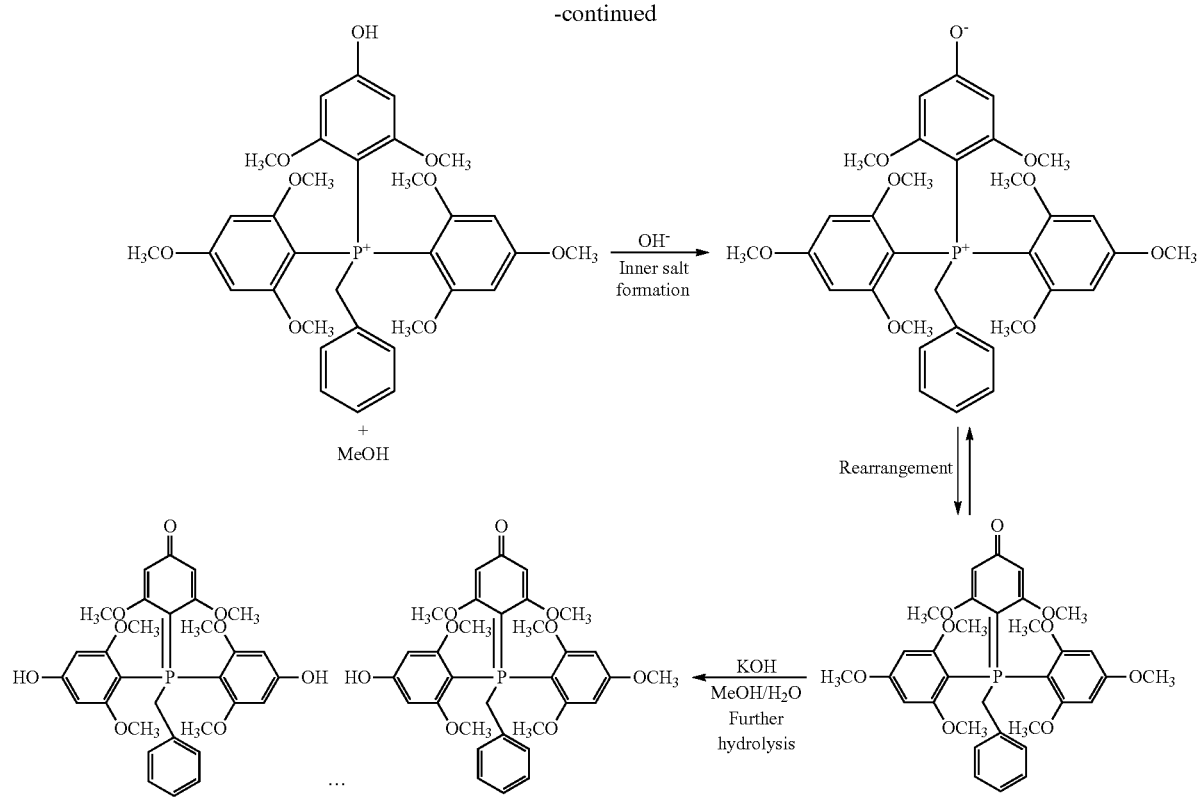

To verify the proposed mechanism, the inventors tested each step individually. Step 1 (ether hydrolysis): Literature suggests that anisole (methoxybenzene) degrades into phenol (hydroxybenzene) in base at high temperature, producing methanol. Unfortunately, (deuterated) methanol is already present in the test solution (as the solvent), rendering detection of the formation of a small quantity by $^1$H NMR difficult. This was overcome by changing the solvent from deuterated methanol to deuterated ethanol for one experiment. Methanol was generated over time, confirming that ether hydrolysis takes place.

Step 2 (ylide formation): Acid was added to the degradation products to force the back reaction from ylide to alcohol.

Step 3 (ketone rearrangement): Typical of aryl ketones, the reaction mixture turned orange during degradation. Additionally, FTIR spectroscopy identified a characteristic ketone absorption peak.

Step 4 (further hydrolysis): The $^{31}$P spectrum suggested that multiple similar products form after ketone rearrangement, consistent with statistical hydrolysis of the remaining methoxyl substituents into hydroxyl groups.

This mechanism demonstrates that due to the strong electron-donating ability of nine methoxyl groups, the essential structure of TPQP$_{Bn}$ becomes much less susceptible to OH$^-$ attack so that the overall alkaline stability of TPQP$_{Bn}$OH is enhanced. However, under basic conditions the methoxyl groups on the benzene rings could undergo ether hydrolysis to form phenolic hydroxyl groups, and this becomes the weak point of TPQP$_{Bn}$. Therefore, finding a balance between the electron density on the phosphorus atom and the alkaline stability of substituents on the benzene rings was considered important for designing a more stable quaternary phosphonium cation.

Tris(2,4,6-trimethylphenyl) phosphonium (9MeTPP$_Q$) Cations

The inventors have designed an improved type of cation, 9MeTPP$_Q$, containing no methoxyl groups and therefore capable of degrading more slowly than the TPQP$_{Bn}$ cation.

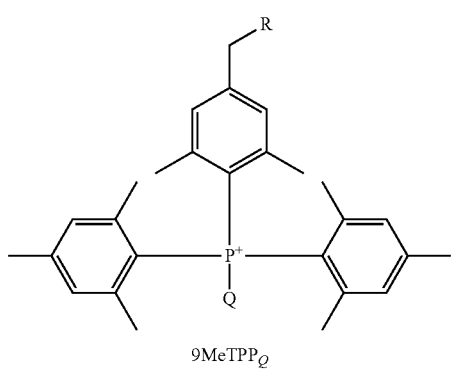

9MeTPP$_Q$

The Q group is a quaternizing moiety selected from substituted or unsubstituted alkyl groups, which may exclude benzyl and/or substituted benzyl. Specific examples of suitable alkyl groups include methyl, ethyl, 1-propyl and 1-butyl. Typically, Q will have at most 10 carbon atoms, or at most 9, 8, 7, 6 or 5 carbon atoms. Q may also be a polymer residue, i.e., -Q represents a bond to a polymer, for example an organic polymer. The bond may be directly connected to the backbone of the polymer, or connected to a group pendant from the backbone. In either case, Q is a polymer residue according to the invention. Examples of suitable polymers include substituted or unsubstituted polysulfone and poly(phenylene oxide) polymers. R may be a polymer residue as discussed above for Q, or it may be H. In any case, the counterion is usually a halide (chloride, bromide or iodide) after synthesis, but it can be converted to hydroxide by simple immersion in a base. When used in an HEM, membranes comprising 9MeTPP$_Q$ cations are either in hydroxide form or carbonate/bicarbonate form, the latter due to absorption of atmospheric $CO_2$. In some embodiments, Q is methyl and R is a polymer residue. In some embodiments, Q is a polymer residue and R is H. Typically, only one of Q and R is a polymer residue. Compounds comprising 9MeTPP$_Q$ cations, including ones in which Q and/or R either are or are not polymer residues, can be incorporated into membranes for use in any of a variety of applications, as discussed elsewhere herein. For example, fuel cells and electrolyzers may benefit from their use. Membranes incorporating compounds comprising 9MeTPP$_Q$ cations typically have a thickness of at least 1 μm, or at least 2, 5, 10 or 20 μm. The thickness is typically at most 100 μm, or at most 75, 60, 50, 40 or 30 μm. In some embodiments, no phosphonium or ammonium salts other than those based on 9MeTPP$_Q$ cations are present in the membrane. Methods of fabricating membranes suitable for the applications discussed herein are well known in the art.

In some embodiments, the 9MeTPP$_Q$ cation, either in small molecule form or when attached to a polymer, can be prepared in the same manner as TPQP$_{Bn}$, i.e., by quaternizing the corresponding phosphine.

Initially, the inventors attempted to synthesize 9MeTPP$_{Bn}$ (Q=benzyl) by quaternizing the phosphine with BnCl. No reaction occurred, so the inventors tested two other benzyl halides (BnBr and BnI) under a variety of conditions, all without success (Table 1).

TABLE 1

Unsuccessful reaction conditions for quaternization with benzyl halides (BnX) to produce 9MeTPP$_{Bn}$

| X | Temperature (° C.) | Time (day) | Solvent | Result (if other than "no reaction") |
|---|---|---|---|---|
| Cl | 40 | 1 | THF | |
| Cl | 60 | 1 | THF or hexane | |
| Cl | 100 | 1 | Toluene | |
| Cl | 100 | 1 | DMF | |
| Cl | 150 | 1 | DMF | The solvent quaternized. |
| Cl | 180 | 7 | None (neat) | |
| Br | 40 | 1 | THF | |
| Br | 60 | 1 | THF | |
| Br | 100 | 1 | Toluene | |
| Br | 100 | 1 | DMF | |
| Br | 180 | 7 | None (neat) | |
| I | 40 | 1 | THF | |
| I | 60 | 1 | THF or hexane | |
| I | 100 | 1 | Toluene | |
| I | 100 | 1 | DMF | |
| I | 180 | 7 | None (neat) | |

Finally, the inventors were able to quaternize the phosphine with MeI, producing a 9MeTPP$_{Me}$ cation (R=Me). To anticipate a possible concern that any superior durability of 9MeTPP$_{Me}$ could be attributed to the switch from a benzyl group to an alkyl group as the quaternizing moiety, the inventors prepared (TPQP$_{Me}$), the methyl analog of TPQP$_{Bn}$.

The phosphine precursors of TPQP$_{Bn}$ and 9MeTPP$_{Bn}$ showed significantly different reactivity toward quaternization, for which two possible explanations are apparent: electron density at the P atom, and steric effects. Regarding electron density, $^{31}$P NMR spectroscopy suggests that the electron density at the P atom is lower for the phosphine precursor of 9MeTPP$_{Bn}$ than for the precursor of TPQP$_{Bn}$ (−37 ppm vs. −70 ppm in CDCl$_3$), implying lower nucleophilicity. However, this electron deficiency cannot fully explain why raising the temperature did not kickstart the reaction or why quaternization with the alkyl halide was so strongly preferred. Regarding steric effects, the Me groups of precursor of 9MeTPP$_{Bn}$ are more rigid and therefore more sterically hindering than the OMe groups of TPQP$_{Bn}$ precursor, to the extent that the phosphine precursor of 9MeTPP$_{Bn}$ reacts with a methyl halide but not with the bulkier benzyl halide. Although OMe is larger than Me, C—O bond rotation allows the trailing methyl substituent to give way to reacting species.

Figure 4:
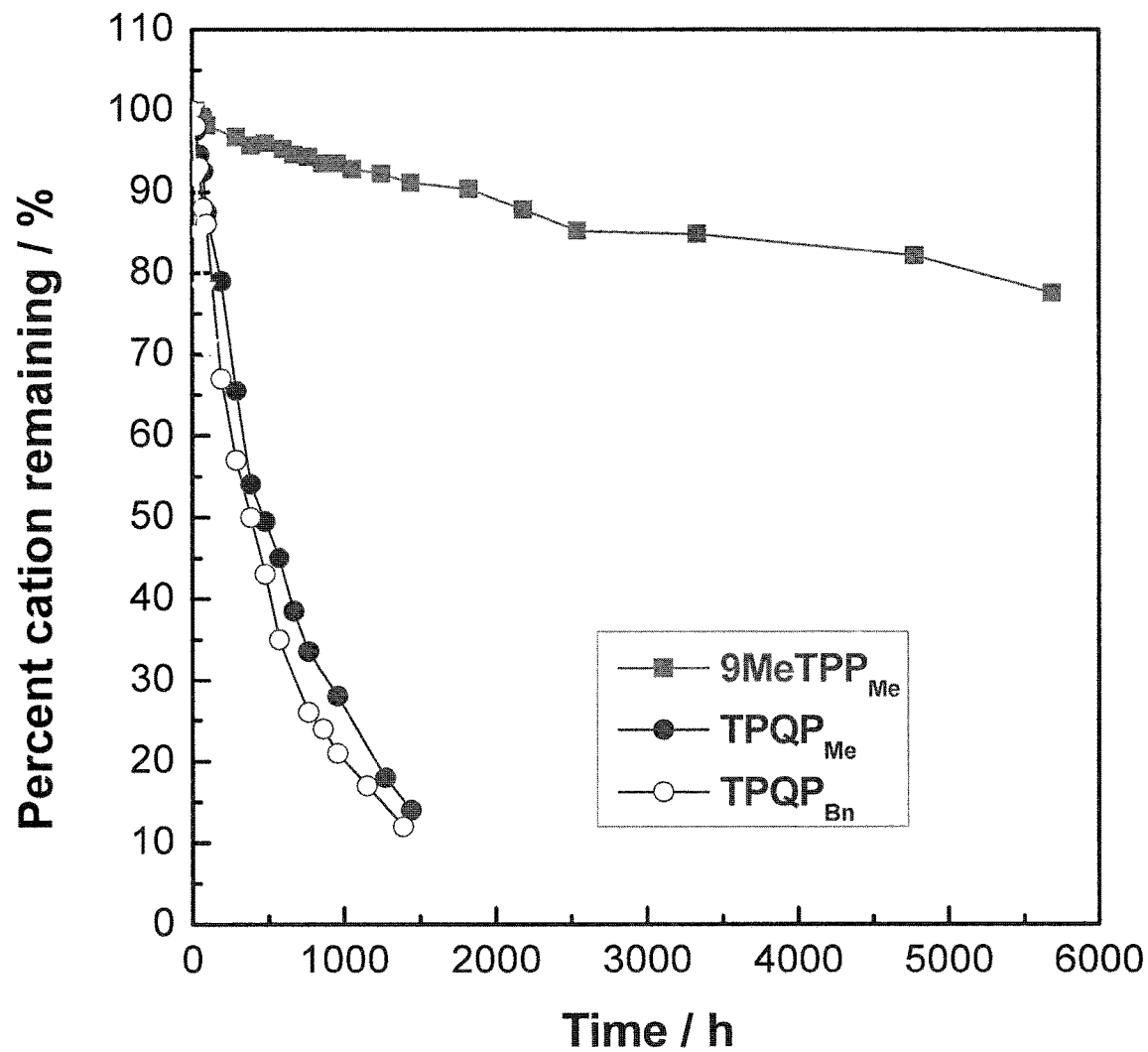
FIG. 4 shows alkaline degradation rates of TPQP$_{Bn}$, TPQP$_{Me}$, and the inventive 9MeTPP$_{Me}$ cation.

The inventors quantified the stability of 9MeTPP$_{Me}$ by a standard procedure: 30 mM phosphonium salt in 1 M KOD (solvent: 5 MeOD:1 D$_2$O) at 80° C. $^1$H NMR and $^{31}$P NMR spectra were taken periodically. After 60 days (1440 h), 93% of 9MeTPP$_{Me}$ remained, whereas only 14% of TPQP$_{Me}$ remained (FIG. 4). After 200 days (4800 h), 82% of 9MeTPP$_{Me}$ still remained. Thus, 9MeTPP$_{Me}$ is substantially more stable than TPQP$_{Me}$, and even more so with respect to TPQP$_{Bn}$.

While TPQP$_{Me}$ degraded slightly less rapidly than TPQP$_{Bn}$ over 40 days (960 h) (72% vs. 79% degradation), the improvement was insignificant compared with that achieved by 9MeTPP$_{Me}$ (8% vs. 72% degradation). Thus, the switch from benzyl halide to methyl halide quaternization is not the major reason for the superior stability of 9MeTPP$_{Me}$. The corresponding phosphine oxide is the sole degradation product of 9MeTPP$_{Me}$, as shown by $^1$H NMR and $^{31}$P NMR spectra of the product. Without wishing to be bound by any particular explanation, the inventors propose that 9MeTPP$_{Me}$ degrades through an oxidation mechanism, at least largely and perhaps exclusively. The enhanced alkaline stability of 9MeTPP$_{Me}$ comes not only from the stable substituents on the benzene rings, but more importantly from the significant steric hindrance of the nine methyl groups, protecting the P center from OH$^-$ attack.

Polymers Comprising 9MeTPP$_Q$ Cations

Three strategies were used to link 9MeTPP$_Q$ cations to polymer backbones. For Strategies 1 & 2, polysulfone was taken as the typical backbone, but these two strategies can be analogically applied to other aromatic polymers. For Strategy 3, poly(4-bromostyrene) was taken as the typical backbone, but this strategy can be analogously applied to any other polymer containing bromophenyl or other bromoaromatic groups.

Strategy 1: One methyl group on a benzene ring of 9MeTPP$_{Me}$ was brominated by using N-bromosuccinimide (NBS) as the brominating agent and benzoyl peroxide (BPO) as the initiator to provide a bromomethyl group. Reaction of the bromomethylated 9MeTPP$_{Me}$ with an aminated polysulfone provided the 9MeTPP$_{Me}$ functionalized polymer shown in Scheme 2.

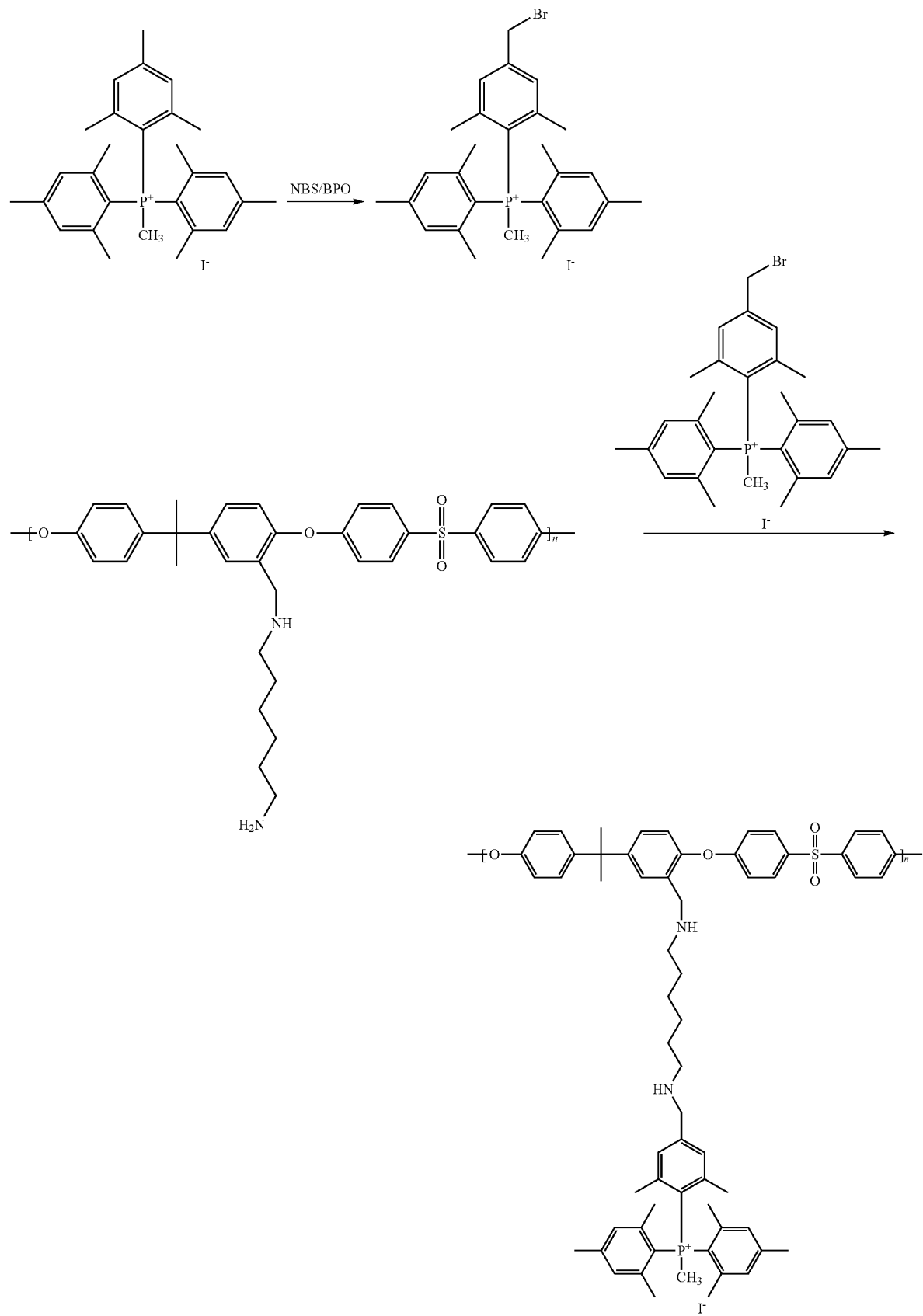

Strategy 2: The method is shown in Scheme 3. The acylating agent 4-iodobutanoyl chloride was synthesized by reacting 4-iodobutyric acid with thionyl chloride. Then the polymer backbone was acylated by 4-iodobutanoyl chloride to introduce the iodide group. Finally, the acylated polymer was quaternized with the corresponding phosphine to introduce the 9MeTPP$_Q$ cation. In this way, a polysulfone can be functionalized with substituents bearing a 9MeTPP$_Q$ cation. The same approach can be used to functionalize poly(phenylene oxide). The same approach can be used for either polymer, using iodoalkanoic acids other than iodobutyric. For example, the acid may be iodoacetic, iodopropanoic, iodopentanoic, iodohexanoic, or any one of the iodoalkanoic acids having from 7 to 12 carbon atoms. If desired, the C=O bond can be easily reduced to —CH$_2$ by hydrosilanes in the presence of triflic acid.

Scheme 3

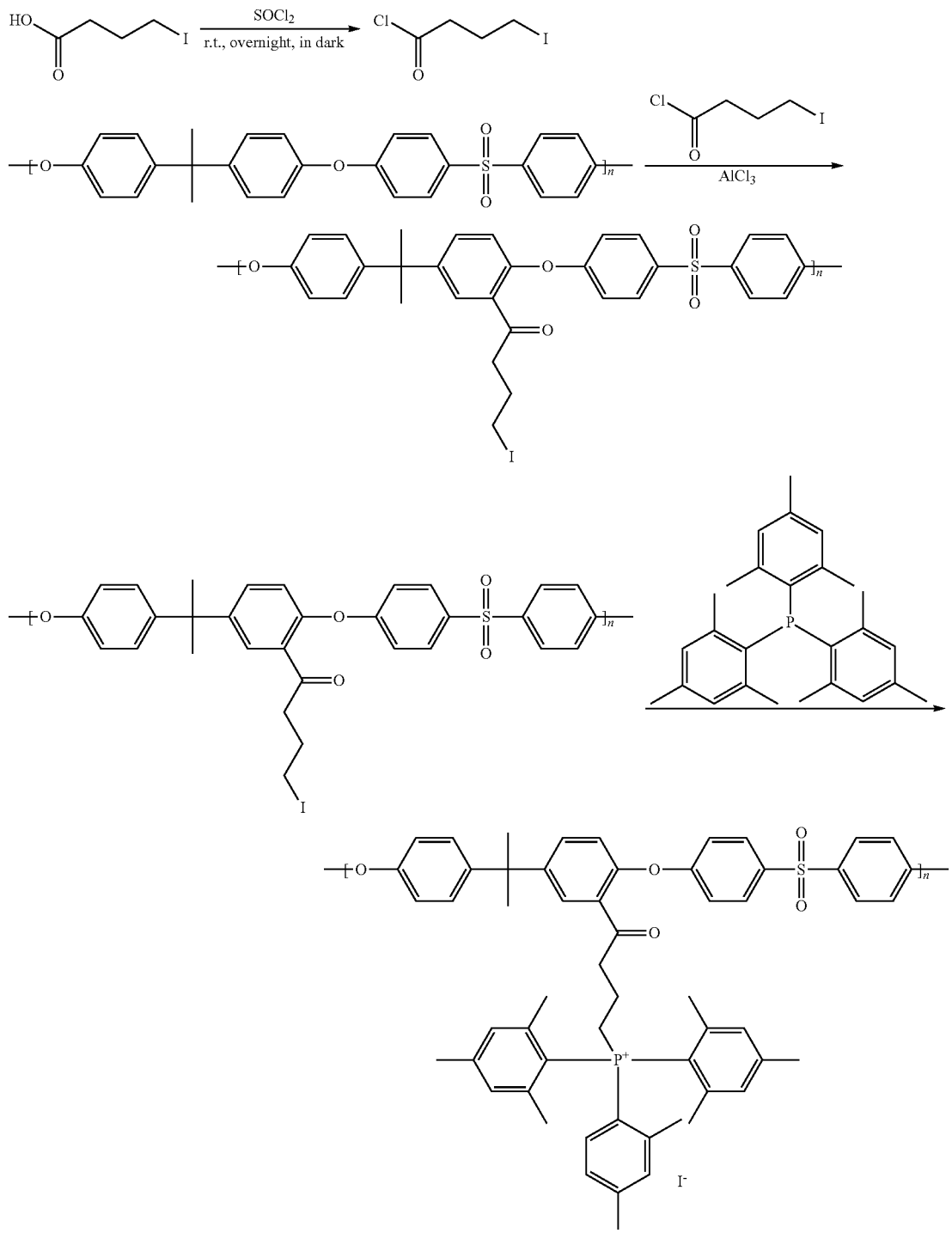

Strategy 3: The method is shown in Scheme 4. Triarylphosphine with eight methyl groups and one vinyl group was synthesized as the precursor, which was then attached via the Heck reaction to the polymer backbone. Finally, the phosphine on the polymer backbone was quaternized with CH$_3$I to provide a substituted 9MeTPP$_{Me}$ cation.

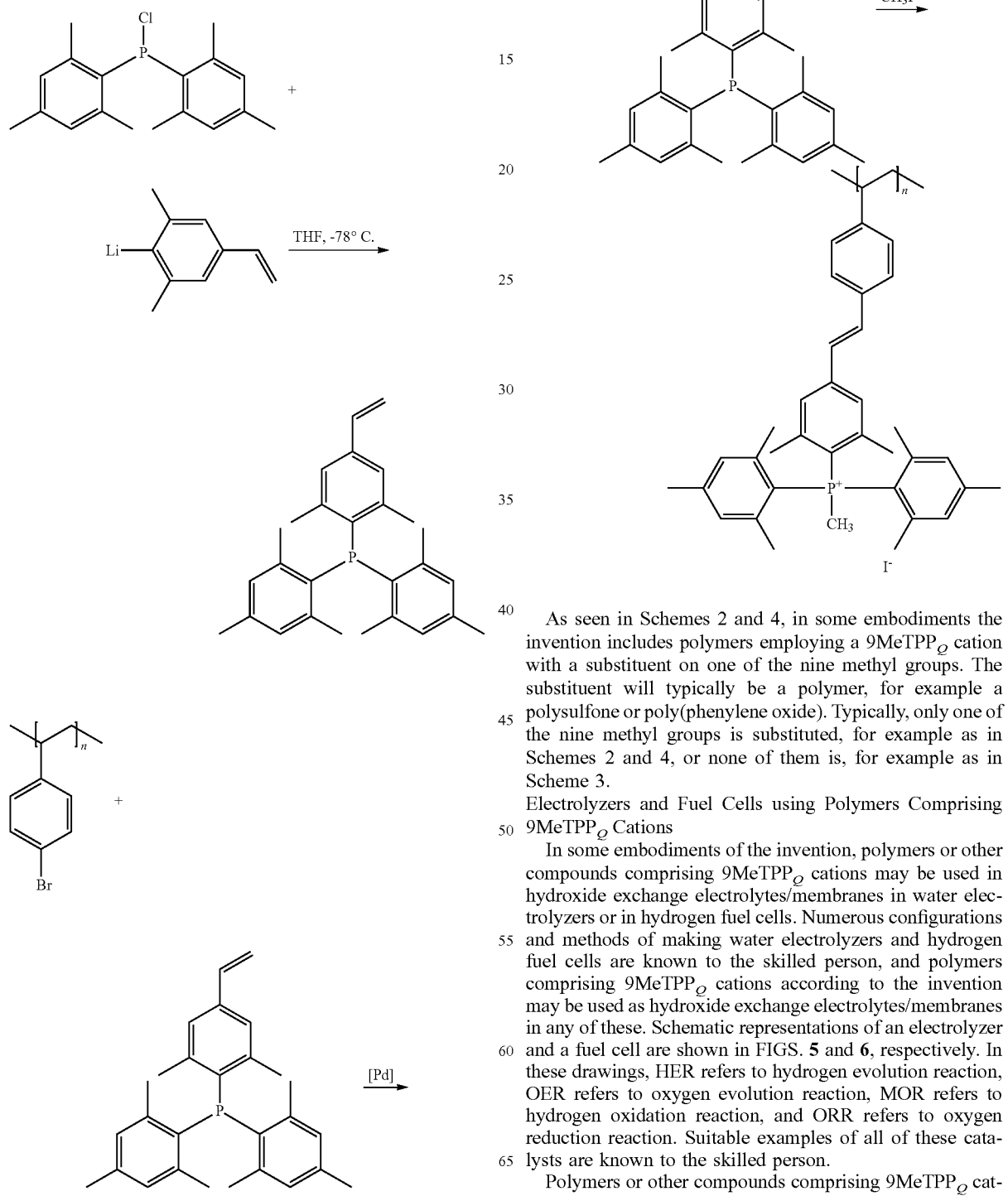

As seen in Schemes 2 and 4, in some embodiments the invention includes polymers employing a 9MeTPP$_Q$ cation with a substituent on one of the nine methyl groups. The substituent will typically be a polymer, for example a polysulfone or poly(phenylene oxide). Typically, only one of the nine methyl groups is substituted, for example as in Schemes 2 and 4, or none of them is, for example as in Scheme 3.

Electrolyzers and Fuel Cells using Polymers Comprising 9MeTPP$_Q$ Cations

Figure 5:
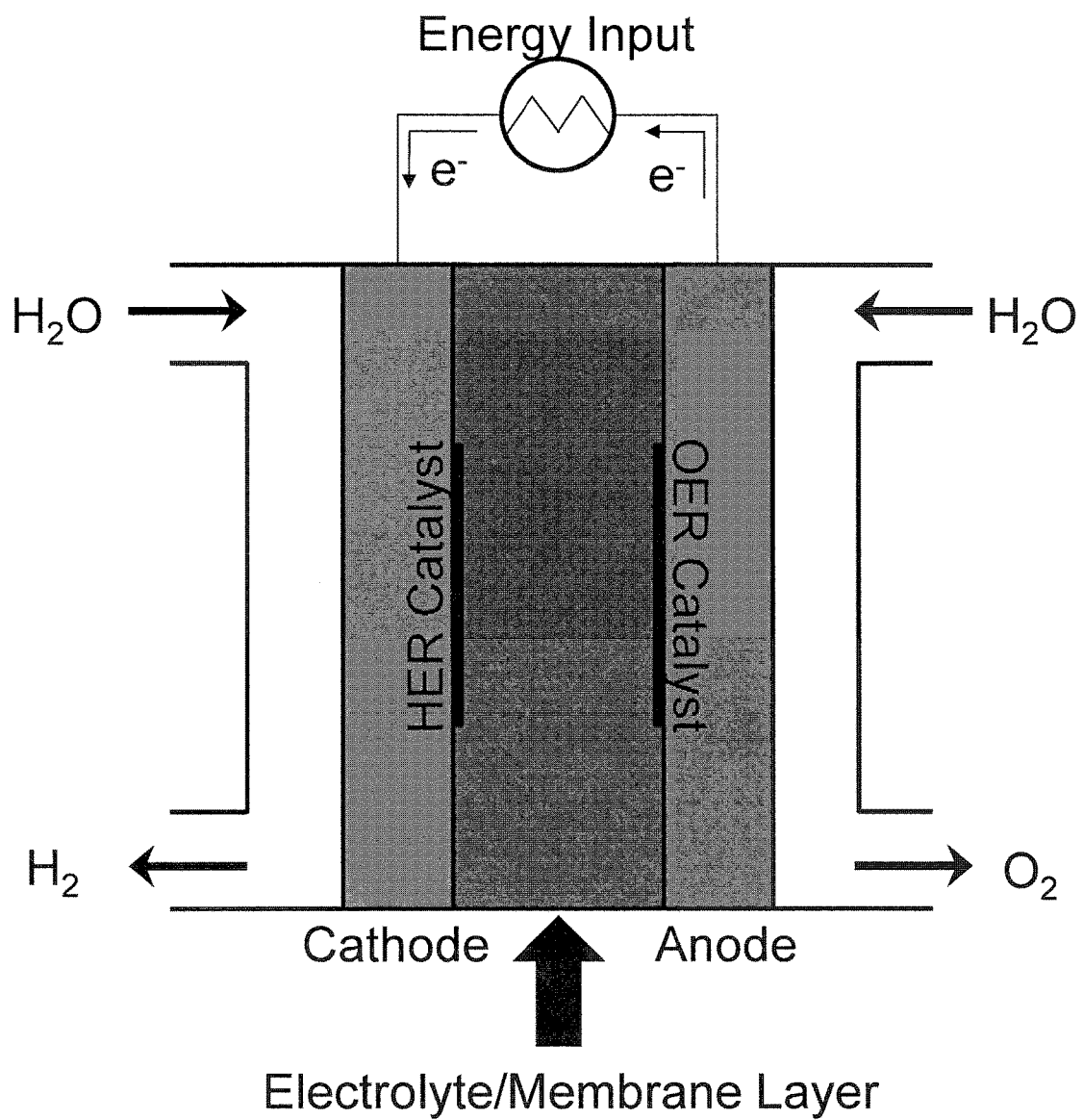
FIG. 5 is a schematic representation of a water electrolyzer using a polymer comprising 9MeTPP$_Q$ cations as the electrolyte/membrane layer according to the invention.
Figure 6:
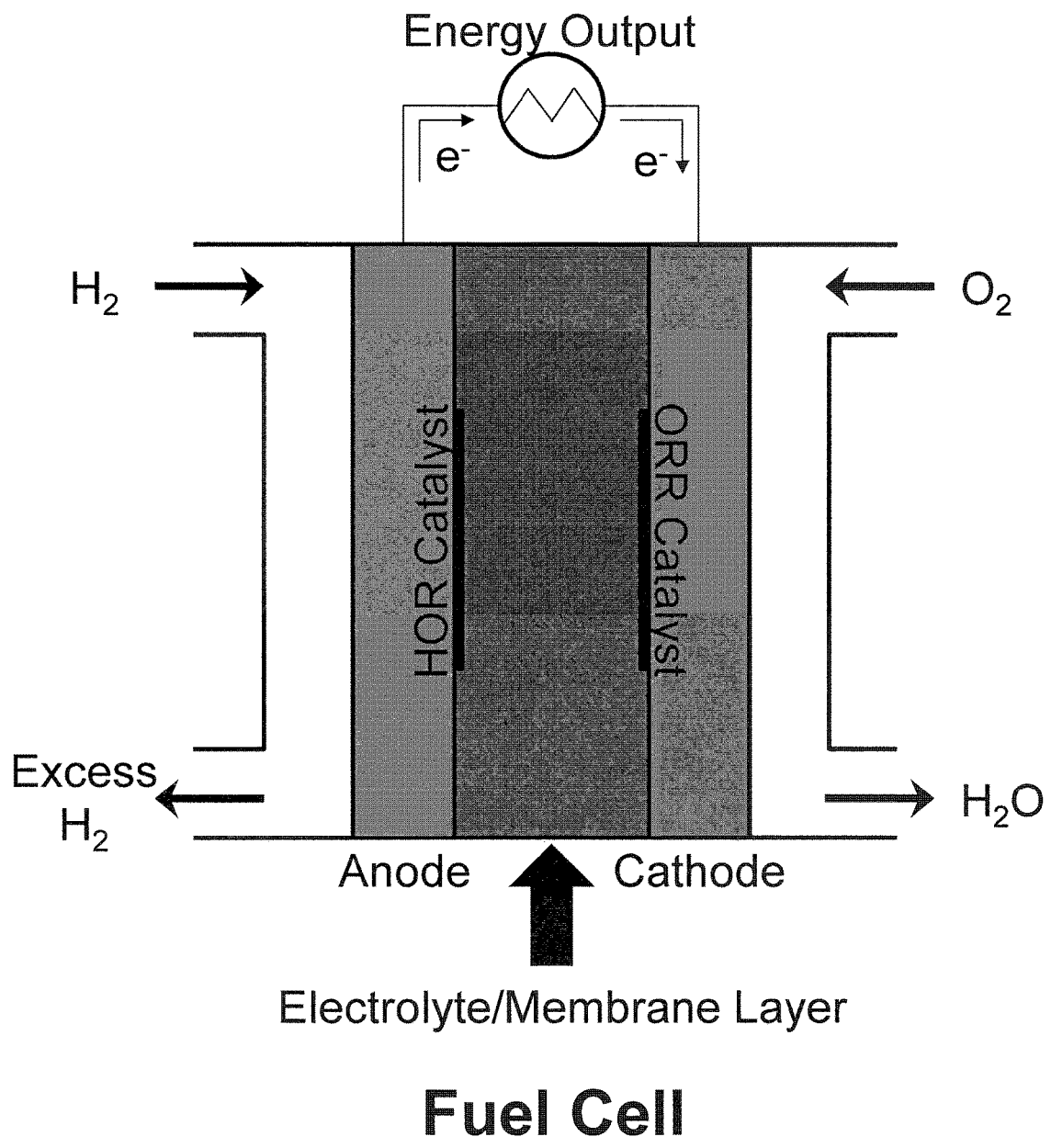
FIG. 6 is a schematic representation of a hydrogen fuel cell using a polymer comprising 9MeTPP$_Q$ cations as the electrolyte/membrane layer according to the invention.

In some embodiments of the invention, polymers or other compounds comprising 9MeTPP$_Q$ cations may be used in hydroxide exchange electrolytes/membranes in water electrolyzers or in hydrogen fuel cells. Numerous configurations and methods of making water electrolyzers and hydrogen fuel cells are known to the skilled person, and polymers comprising 9MeTPP$_Q$ cations according to the invention may be used as hydroxide exchange electrolytes/membranes in any of these. Schematic representations of an electrolyzer and a fuel cell are shown in FIGS. 5 and 6, respectively. In these drawings, HER refers to hydrogen evolution reaction, OER refers to oxygen evolution reaction, MOR refers to hydrogen oxidation reaction, and ORR refers to oxygen reduction reaction. Suitable examples of all of these catalysts are known to the skilled person.

Polymers or other compounds comprising 9MeTPP$_Q$ cations may also be used in membranes for use in fuel cells using fuels other than hydrogen. They may also be used in membranes for other electrochemical devices and processes including, but not limited to, batteries, for example redox flow batteries, zinc-air batteries and other metal-air batteries, solar hydrogen devices, desalination devices, and electrodialysis devices. The skilled person will be aware of how to incorporate the membranes in these devices.

EXAMPLES

General Procedure for Quaternizing Phosphines

Methylations were performed by stirring a mixture of the corresponding phosphine (10 mmol) and 2 mL (32 mmol) of iodomethane at room temperature for 24 hours. The precipitated product was collected by filtration, rinsed three times with THF, and dried under vacuum.

Benzylations were performed by stirring a mixture of the corresponding phosphine (10 mmol) and 2.54 g (20 mmol) of benzyl chloride in 10 mL of THF at 60° C. for 24 hours. The precipitated product was collected by filtration, rinsed three times with THF, and dried under vacuum.

Bromination of methyl tris(2,4,6-trimethylphenyl)phosphonium iodide

A 3.99 g (7.5 mmol) portion of methyl tris(2,4,6-trimethylphenyl)phosphonium iodide and 1.33 g (7.5 mmol) N-bromosuccinimide (NBS) were dissolved in 100 mL dichloroethane. The solution was heated to 85° C., followed by addition of 0.09 g (0.375 mmol) benzoyl peroxide (BPO). The mixture was stirred at room temperature for 24 h. After the reaction, the mixture was added dropwise into 500 mL diethyl ether to precipitate the product. The precipitate was washed three times with diethyl ether and dried under vacuum at room temperature for 24 h to give the product.

Synthesis of Chloromethylated Polysulfone (CMPSf)

A 15 g (33.9 mmol) portion of polysulfone (PSf) was dissolved in 750 mL chloroform, and 10.18 g (339 mmol) paraformaldehyde and 36.9 g (339 mmol) trimethylchlorosilane were then added, followed by dropwise addition of 1.767 g (6.78 mmol) stannic chloride. The mixture was stirred at 55° C. for 72 h, after which the reaction mixture was poured into ethanol to precipitate the product. The precipitate was separated by filtration, washed three times with ethanol and dried under vacuum at room temperature for 24 h.

Synthesis of Butylaminated Polysulfone (PSf-BA)

A 2.02 g (4 mmol) portion of CMPSf was dissolved in 40 mL 1-methyl-2-pyrrolidinone (NMP), followed by addition of 4.69 mL (40 mmol) butylamine and 3.16 g (8 mmol) cesium carbonate ($Cs_2CO_3$). The mixture was stirred at room temperature for 48 h. After the reaction, the mixture was added dropwise into 400 mL of deionized water to precipitate the polymer. The precipitate was washed three times with deionized water, filtered and dried under vacuum at 60° C. for 48 h.

Incorporation of Brominated $9MeTPP_{me}$ into PSf-BA

A 1.51 g (2 mmol) portion of brominated methyl tris(2,4,6-trimethylphenyl)phosphonium iodide and 1.1 g (2 mmol) PSf-BA was dissolved in 10 mL NMP. The mixture was stirred at 60° C. for 48 h. After the reaction, the mixture was added dropwise into 100 mL diethyl ether to precipitate the polymer. The precipitate was washed three times with diethyl ether, filtered and dried under vacuum at room temperature for 48 h.

General Procedure for Acylating poly(phenylene oxide) (PPO)

A 1.2 g (10 mmol) portion of PPO was dissolved in 100 mL dichloromethane in a flask under argon. The flask was cooled down to 0° C., and 4-iodobutyric chloride or iodoacetic chloride (10 mmol) was added. 1.33 g (10 mmol) aluminum chloride ($AlCl_3$) was added to the flask. The bath was removed and the reaction was allowed to warm to room temperature over 6 h while stirring. The solution was concentrated to 50 mL and poured into 200 mL ethanol to precipitate the product. The precipitate was separated by filtration, washed three times with ethanol and dried under vacuum at room temperature for 24 h.

General Procedure for Acylating PSf

A 4.42 g (10 mmol) portion of PSf was dissolved in 100 mL dichloromethane in a flask under argon. The mixture was cooled to 0° C., and 4-iodobutyric chloride or iodoacetic chloride (10 mmol) was added, followed by 1.33 g (10 mmol) aluminum chloride ($AlCl_3$). The cooling bath was removed and the reaction mixture was allowed to warm to room temperature over 6 h while stirring. The mixture was concentrated to 50 mL and poured into 200 mL ethanol to precipitate the product, which was then separated by filtration, washed three times with ethanol and dried under vacuum at room temperature for 24 h.

Incorporation of tris(2,4,6-trimethylphenyl)phosphine to Acylated Polymer Backbone A 2 mmol portion of acylated PSf and 5.32 g (10 mmol) tris(2,4,6-trimethylphenyl)phosphine were dissolved in 10 mL NMP. The mixture was stirred at 110° C. for 48 h. After the reaction, the mixture was cooled to room temperature, and added dropwise into 100 mL diethyl ether to precipitate the polymer. The precipitate was washed three times with diethyl ether, filtered and dried under vacuum at room temperature for 48 h.

Synthesis of 4-iodobutyric Chloride

To a solution of 1 g (4.67 mmol) 4-iodobutyric acid in 10 mL chloroform was dropwise added 3.65 mL (50 mmol) thionyl chloride. The solution was stirred at room temperature for 24 h. The solvent was evaporated to afford 4-iodobutyric chloride as a brown oil.

Synthesis of 4-vinyl-2,6-dimethylphenyl-bis(2,4,6-trimethylphenyl) phosphine

Under an anhydrous and oxygen-free atmosphere, 5 mL butyllithium/cyclohexane solution (2.0 M) was added dropwise to a solution of 1.35 g (10 mmol) 4-bromo-3,5-dimethylstyrene in 15 mL anhydrous THF at −78° C. The solution was stirred for 24 h at −78° C. to afford 4-lithio-3,5-dimethylstyrene. To the freshly prepared 4-lithio-3,5-dimethylstyrene THF solution at −78° C., was added bis(2,4,6-trimethylphenyl)phosphorus chloride (10 mmol, 3.05 g; Sigma-Aldrich) in 40 mL of anhydrous THF dropwise with stirring over 20 min. After stirring at −78° C. for 30 min, the reaction mixture was allowed to warm to room temperature. After stirring at room temperature for 1 h, the reaction mixture was hydrolyzed with HCl (1 M, 20 mL), followed by addition of chloroform and then the organic solution was separated and dried over anhydrous $MgSO_4$. The solvent was evaporated at reduced pressure. The residue was washed with methanol three times, separated by filtration and dried under vacuum at room temperature for 24 h.

Synthesis of Phosphine Functionalized Polymer

To 4-vinyl-2,6-dimethylphenyl-bis(2,4,6-trimethylphenyl) phosphine (0.093 g, 0.25 mmol), poly(4-bromostyrene) (0.023 g, 0.125 mmol) and bis(triphenylphosphine)-palladium(II) dichloride ($PdCl_2(PPh_3)_2$) (7.0 mg, 0.01 mmol) in 5 mL N,N-dimethylformamide (DMF), was added triethylamine (0.11 mL, 0.75 mmol), and formic acid (88 wt %, 0.02 mL, 0.5 mmol). The solution was then heated to 80° C. for 24 h. The solution was dropwise added to 50 mL methanol to precipitate the product. The precipitate was collected by filtration, rinsed three times with methanol, and dried under vacuum.

Quaternization of Phosphine Functionalized Polymer

A mixture of the 1 g phosphine functionalized polymer and 4 mL iodomethane (64 mmol) was stirred at room temperature for 24 h. The solution was added dropwise to 40 mL ethyl ether to precipitate the product. The precipitate was collected by filtration, rinsed three times with ethyl ether, and dried under vacuum.

Alkaline Stability of TPQP$_{Bn}$Cl and BTMABr

Test conditions and procedure: A 1 M alkaline solution was prepared by dissolving KOD in a 5:1 (vol) mixture of CD$_3$OD/D$_2$O. (The purpose of the methanol was to accelerate degradation.) The quaternary ammonium or phosphonium compound was added to the alkaline solution at a molar ratio of 30 KOD:1 mole of compound (i.e., 0.033 M). A similar quantity of 3-(trimethylsilyl)-1-propanesulfonic acid sodium salt (TMS(CH$_2$)$_3$SO$_3$Na) was also added to serve as an internal standard. The mixture was held at 80° C. for 58 days, with $^1$H and $^{31}$P NMR taken periodically for BTMABr and TPQP$_{Bn}$Cl, respectively. Test results are shown in FIG. 1.

Alkaline Stability of 9MeTPP$_{Me}$

The alkaline stability of 9MeTPP$_{Me}$ was evaluated using a 30 mM phosphonium salt solution in 1 M KOD (solvent: 5 MeOD:1 D$_2$O) at 80° C. $^1$H NMR and $^{31}$P NMR spectra were taken periodically. The results are shown in FIG. 4.

Although the invention is illustrated and described herein with reference to specific embodiments, the invention is not intended to be limited to the details shown. Rather, various modifications may be made in the details within the scope and range of equivalents of the claims without departing from the invention.

What is claimed:

1. A compound comprising a cation of the following structure

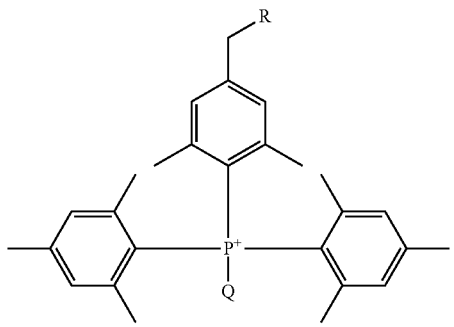

wherein Q is selected from the group consisting of polymer residues and substituted or unsubstituted alkyl groups, and R is H or a polymer residue.

2. The compound according to claim 1 wherein Q is alkyl.

3. The compound according to claim 1 wherein Q is methyl.

4. The compound according to claim 1 wherein R is a polymer residue.

5. The compound according to claim 1 wherein R is a residue of a polysulfone.

6. The compound according to claim 1 wherein R is a residue of a poly(phenylene oxide).

7. The compound according to claim 1 wherein Q is a polymer residue.

8. The compound according to claim 1 wherein Q is a residue of a polysulfone.

9. The compound according to claim 1 wherein Q comprise a residue of a poly(phenylene oxide).

10. The compound according to claim 1 wherein one and only one of R and Q is a polymer residue.

11. The compound according to claim 7 wherein R is H.

12. The compound according to claim 1 wherein the compound comprises hydroxide as a counterion.

13. The compound according to claim 1 wherein the compound comprises halide as a counterion.

14. A membrane comprising the compound according to claim 1.

15. An electrochemical device employing the membrane according to claim 14.

16. The electrochemical device according to claim 15, wherein the electrochemical device is a fuel cell.

17. The electrochemical device according to claim 15, wherein the electrochemical device is an electrolyzer.

18. The electrochemical device according to claim 15, wherein the electrochemical device is a battery.

19. The electrochemical device according to claim 15, wherein the electrochemical device is a solar hydrogen device.

20. The electrochemical device according to claim 15, wherein the electrochemical device is a desalination device.

21. The electrochemical device according to claim 15, wherein the electrochemical device is an electrodialysis device.

22. The compound according to claim 8 wherein R is H.

23. The compound according to claim 9 wherein R is H.

24. The compound according to claim 10 wherein R is H.

* * * * *